(12) United States Patent
Lee et al.

(10) Patent No.: US 10,313,071 B2
(45) Date of Patent: Jun. 4, 2019

(54) MONITORING METHOD BY TERMINAL IN WIRELESS COMMUNICATION SYSTEM SUPPORTING CARRIER AGGREGATION AND DEVICE FOR SAME

(71) Applicant: LG ELECTRONICS INC., Seoul (KR)

(72) Inventors: Seungmin Lee, Seoul (KR); Joonkui Ahn, Seoul (KR); Suckchel Yang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 15/512,715

(22) PCT Filed: Sep. 30, 2015

(86) PCT No.: PCT/KR2015/010277
§ 371 (c)(1),
(2) Date: Mar. 20, 2017

(87) PCT Pub. No.: WO2016/048111
PCT Pub. Date: Mar. 31, 2016

(65) Prior Publication Data
US 2017/0294997 A1 Oct. 12, 2017

Related U.S. Application Data

(60) Provisional application No. 62/056,479, filed on Sep. 27, 2014.

(51) Int. Cl.
*H04L 5/00* (2006.01)
*H04W 24/10* (2009.01)
(Continued)

(52) U.S. Cl.
CPC ............ *H04L 5/0032* (2013.01); *H04L 5/001* (2013.01); *H04L 5/0016* (2013.01);
(Continued)

(58) Field of Classification Search
CPC .. H04J 11/0069–11/0093; H04L 5/0001–5/26; H04W 24/10;
(Continued)

(56) References Cited

U.S. PATENT DOCUMENTS

| | | | |
|---|---|---|---|
| 2012/0044921 A1* | 2/2012 | Chung | H04J 11/0069 370/338 |
| 2013/0088972 A1* | 4/2013 | Kim | H04L 5/001 370/241 |

(Continued)

FOREIGN PATENT DOCUMENTS

| | | |
|---|---|---|
| EP | 3190738 A1 | 7/2017 |
| JP | 2014-500685 A | 1/2014 |

(Continued)

OTHER PUBLICATIONS

Intel Corporation, "On Support of TDD-FDD Carrier Aggregation," 3GPP TSG-RAN WG1 #76, R1-140411, Prague, Czech Republic, Feb. 10-14, 2014, pp. 1-6.

*Primary Examiner* — Timothy J Weidner
(74) *Attorney, Agent, or Firm* — Birch, Stewart, Kolasch & Birch, LLP

(57) ABSTRACT

The present invention relates to monitoring method and device by a terminal in a wireless communication system supporting carrier aggregation. Particularly, a monitoring method comprises the steps of: receiving indication of a first resource interval which is being cross-carrier scheduled by means of a first cell with respect to the first cell, comprising consecutive radio resources, and a second cell comprising non-consecutive radio resources; and, on the first resource (Continued)

interval, blind decoding control information, for a physical downlink shared channel (PDSCH) of the second cell, in a physical downlink control channel (PDCCH) of the first cell.

6 Claims, 11 Drawing Sheets

(51) Int. Cl.
*H04W 72/04* (2009.01)
*H04W 72/08* (2009.01)

(52) U.S. Cl.
CPC .......... *H04L 5/0039* (2013.01); *H04L 5/0041* (2013.01); *H04W 24/10* (2013.01); *H04W 72/042* (2013.01); *H04W 72/0446* (2013.01); *H04W 72/0453* (2013.01); *H04W 72/085* (2013.01)

(58) Field of Classification Search
CPC .......... H04W 36/0005–36/385; H04W 48/02–48/20; H04W 72/005–72/14; H04W 74/002–74/06; H04W 92/02; H04W 92/04; H04W 92/10
See application file for complete search history.

(56) References Cited

U.S. PATENT DOCUMENTS

| | | |
|---|---|---|
| 2014/0112289 A1 | 4/2014 | Kim et al. |
| 2014/0119339 A1 | 5/2014 | Yang et al. |
| 2014/0198748 A1 | 7/2014 | Lee et al. |
| 2017/0064561 A1* | 3/2017 | Tomeba ................ H04W 16/14 370/329 |

FOREIGN PATENT DOCUMENTS

| | | | | |
|---|---|---|---|---|
| KR | 10-2013-0121605 A | | 11/2013 | |
| KR | 20130121605 A | * | 11/2013 | ........... H04L 5/0055 |
| WO | WO-2010123331 A2 | * | 10/2010 | ........... H04J 11/0069 |
| WO | WO-2011155708 A2 | * | 12/2011 | ............ H04L 5/001 |
| WO | WO 2013/096928 A1 | | 6/2013 | |
| WO | WO-2015166792 A1 | * | 11/2015 | ............ H04W 16/14 |

* cited by examiner

FIG. 2
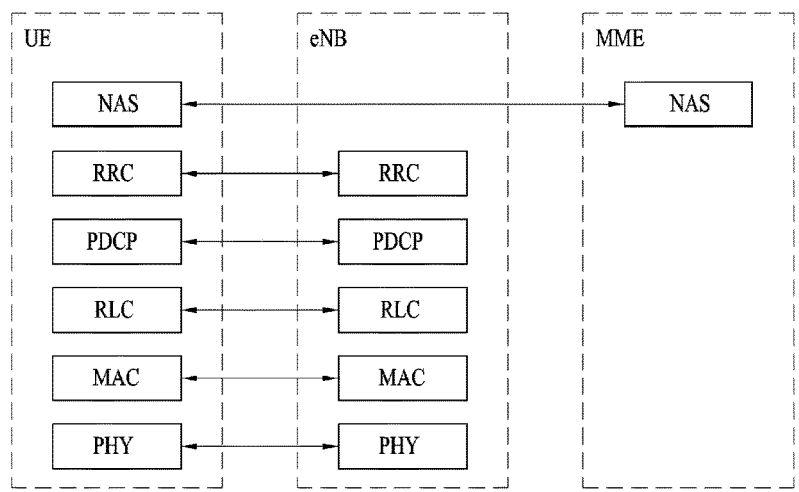
(A) Control-plane protocol stack
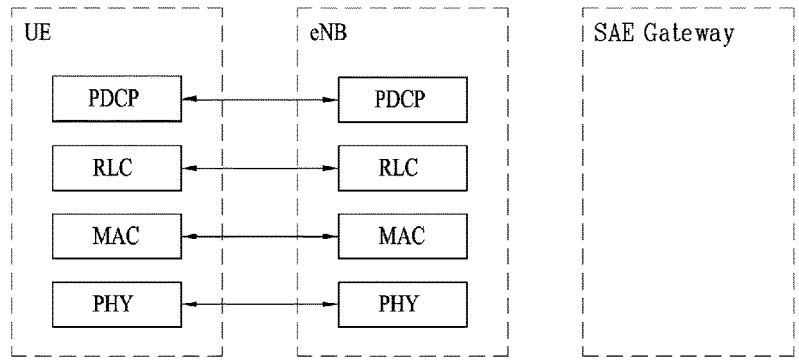
(B) User-plane protocol stack FIG. 7
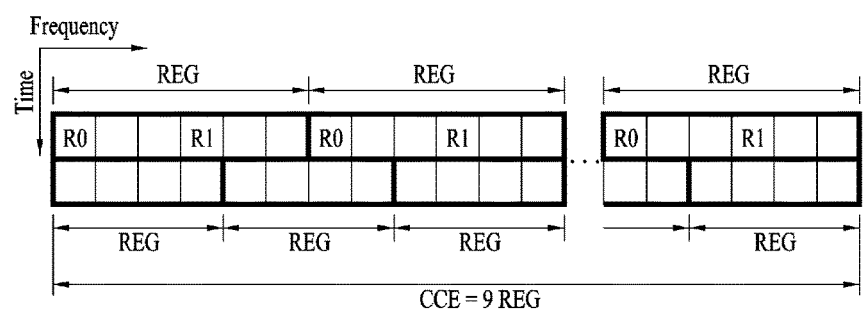
(a) 1TX or 2TX
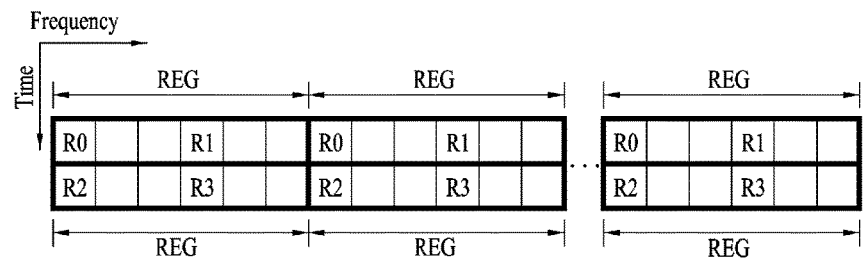
(b) 4 TX FIG. 12
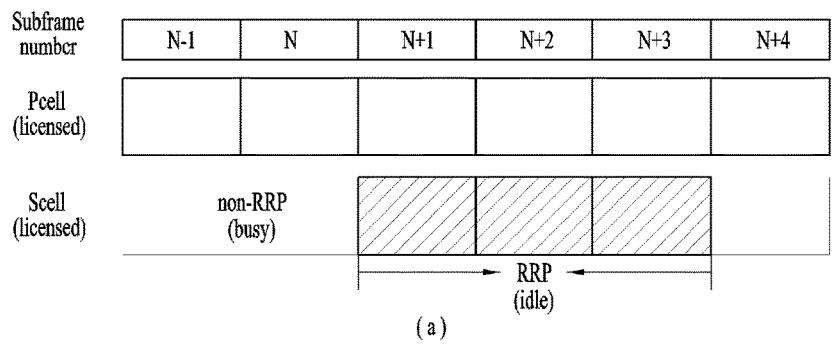
(a)
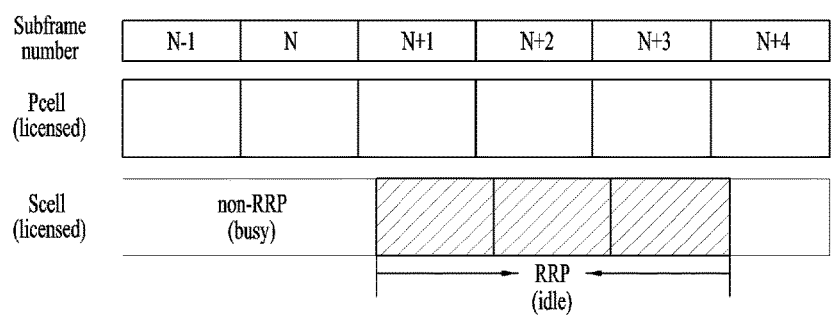
(b)
FIG. 13
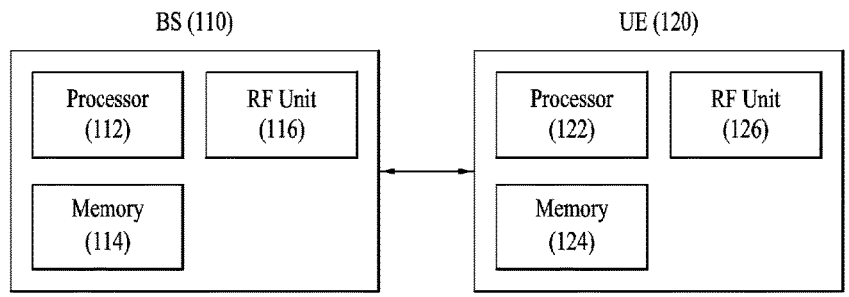

MONITORING METHOD BY TERMINAL IN WIRELESS COMMUNICATION SYSTEM SUPPORTING CARRIER AGGREGATION AND DEVICE FOR SAME

CROSS REFERENCE TO RELATED APPLICATIONS

This application is the National Phase of PCT International Application No. PCT/KR2015/010277, filed on Sep. 30, 2015, which claims priority under 35 U.S.C. 119(e) to U.S. Provisional Application No. 62/056,479, filed on Sep. 27, 2014, all of which are hereby expressly incorporated by reference into the present application.

TECHNICAL FIELD

The present invention relates to a wireless communication system, and more particularly, to a monitoring method and apparatus of a user equipment (UE) in a wireless communication system for supporting carrier aggregation.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a monitoring method and apparatus of a user equipment (UE) in a wireless communication system for supporting carrier aggregation.

It is to be understood that both the foregoing general description and the following detailed description of the present invention are exemplary and explanatory and are intended to provide further explanation of the invention as claimed.

Technical Solution

The object of the present invention can be achieved by providing a monitoring method of a user equipment (UE) in a wireless communication system for supporting carrier aggregation, the method including receiving indication of a first resource period that is cross-carrier scheduled by a first cell with respect to a first cell including contiguous radio resources and a second cell including discontiguous radio resources, and blind-decoding control information for a physical downlink shared channel (PDSCH) of the second cell on a physical downlink control channel (PDCCH) of the first cell in the first resource period.

The method may further include performing blind-decoding on the PDCCH of the first cell associated with a PDSCH of the first cell in a second resource period, wherein the second resource period may include radio resources except for the first resource period among radio resources of the second cell.

The UE may be configured not to perform blind-decoding on the PDCCH of the first cell associated with the PDSCH of the second cell in the second resource period or only a search space associated with the PDSCH of the first cell may be set in the second resource period. The UE may be configured not to configure a search space associated with the PDSCH of the second cell in the second resource period.

A blind-decoding number of times on the PDCCH of the first cell associated with the PDSCH of the second cell in the second resource period may be configured to be reallocated for blind-decoding on the PDCCH of the first cell associated with the PDSCH of the first cell. A blind-decoding number of times on the PDCCH of the first cell associated with the PDSCH of the second cell may be configured to be reallocated for blind-decoding on the PDCCH of the first cell associated with the PDSCH of the first cell corresponding to the same aggregation level.

A blind-decoding number of times on the PDCCH of the first cell associated with the PDSCH of the second cell in the second resource period may be configured to be used to detect information indicating the first resource period.

The first cell may be a licensed band, and the second cell may be an unlicensed band.

Radio resources of the second cell may be occupied only by the UE.

In another aspect of the present invention, provided herein is a user equipment (UE) for performing monitoring in a wireless communication system for supporting carrier aggregation, the UE including a radio frequency unit, and a processor, wherein the processor is configured to receive indication of a first resource period that is cross-carrier scheduled by a first cell with respect to a first cell including contiguous radio resources and a second cell including discontiguous radio resources and to blind-decode control information for a physical downlink shared channel (PDSCH) of the second cell on a physical downlink control channel (PDCCH) of the first cell in the first resource period.

Advantageous Effects

According to exemplary embodiments of the present invention, a user equipment (UE) may be effectively monitored in a wireless communication system for supporting carrier aggregation.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating structures of a control plane and a user plane of a radio interface protocol between a user equipment and E-UTRAN based on the 3GPP radio access network standard;

FIG. 7 illustrates resource units used to configure a downlink control channel in an LTE system;

FIG. 12 illustrates a reserved resource period (RRP) according to the present invention; and FIG. 13 illustrates a base station (BS) and a UE according to an exemplary embodiment of the present invention.

BEST MODE

Figure 1:
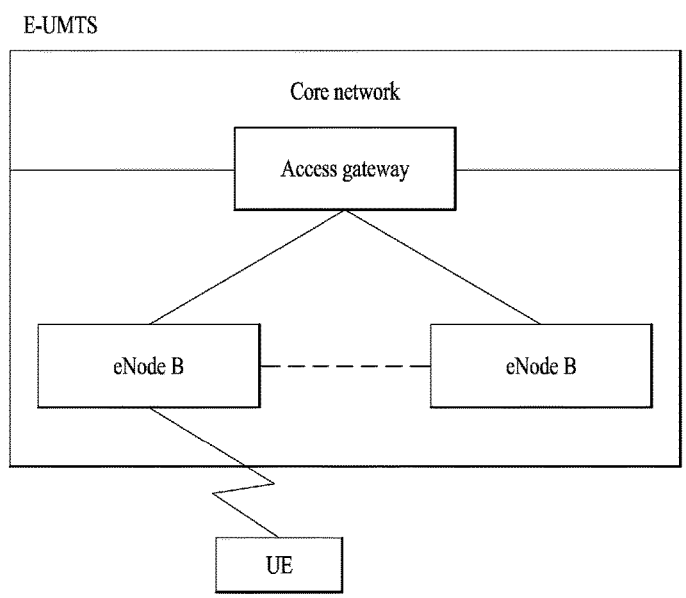
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
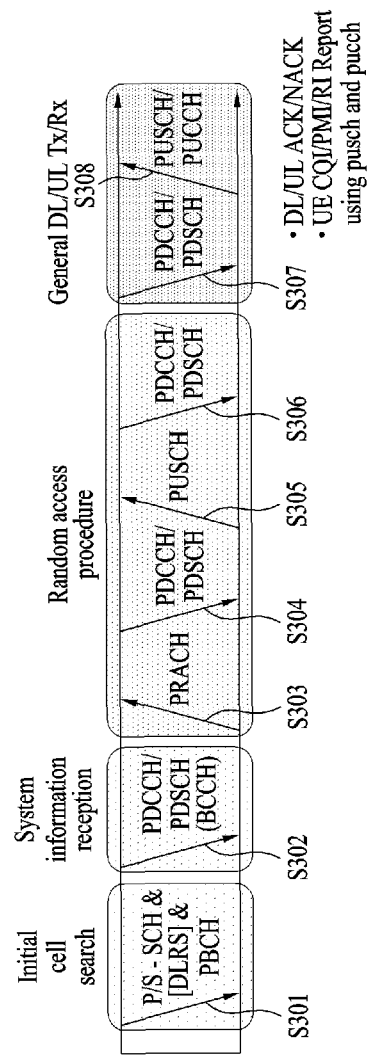
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
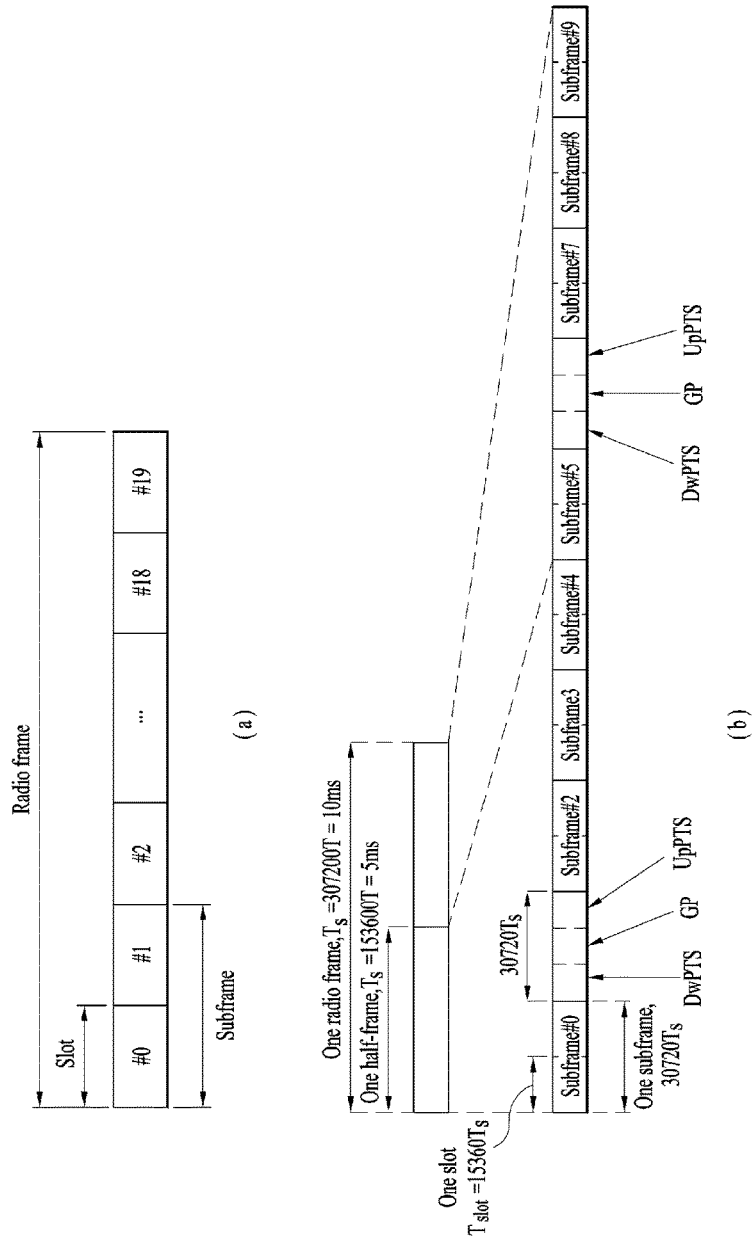
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, in a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 4(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control Channel (PDCCH) and the other OFDM symbols may be allocated to a Physical Downlink Shared Channel (PDSCH).

FIG. 4(b) illustrates the type-2 radio frame structure. A type-2 radio frame includes two half frames, each having four normal subframe including two slots and a special subframe including a Downlink Pilot Time Slot (DwPTS), a Guard Period (GP), and an Uplink Pilot Time Slot (UpPTS).

In the special subframe, the DwPTS is used for initial cell search, synchronization, or channel estimation at a UE. The UpPTS is used for channel estimation and acquisition of uplink transmission synchronization to a UE at an eNB. That is, the DwPTS is used for downlink transmission and the UpPTS is used for uplink transmission and, in particular, the UpPTS is used to transmit a PRACH preamble or an SRS. In addition, the GP is a period between an uplink and a downlink, which eliminates uplink interference caused by multipath delay of a downlink signal.

With regard to the above special subframe, the current 3GPP standard document defines configuration as shown in Table 1 below. In the case of $T_s=1/(15000 \times 2048)$, Table 1 below lists DwPTS and UpPTS and the remaining period is configured as the guard period.

In Table 2 above, D denotes a downlink subframe, U denotes an uplink subframe and S denotes a special subframe. Table 2 above also shows a downlink-uplink switching period in uplink/downlink subframe configuration in each system.

The aforementioned radio frame structure is merely an example and the number of subframes included in the radio frame, the number of slots included in the subframe, or the number of symbols included in the slot may be changed in various ways.

Figure 5:
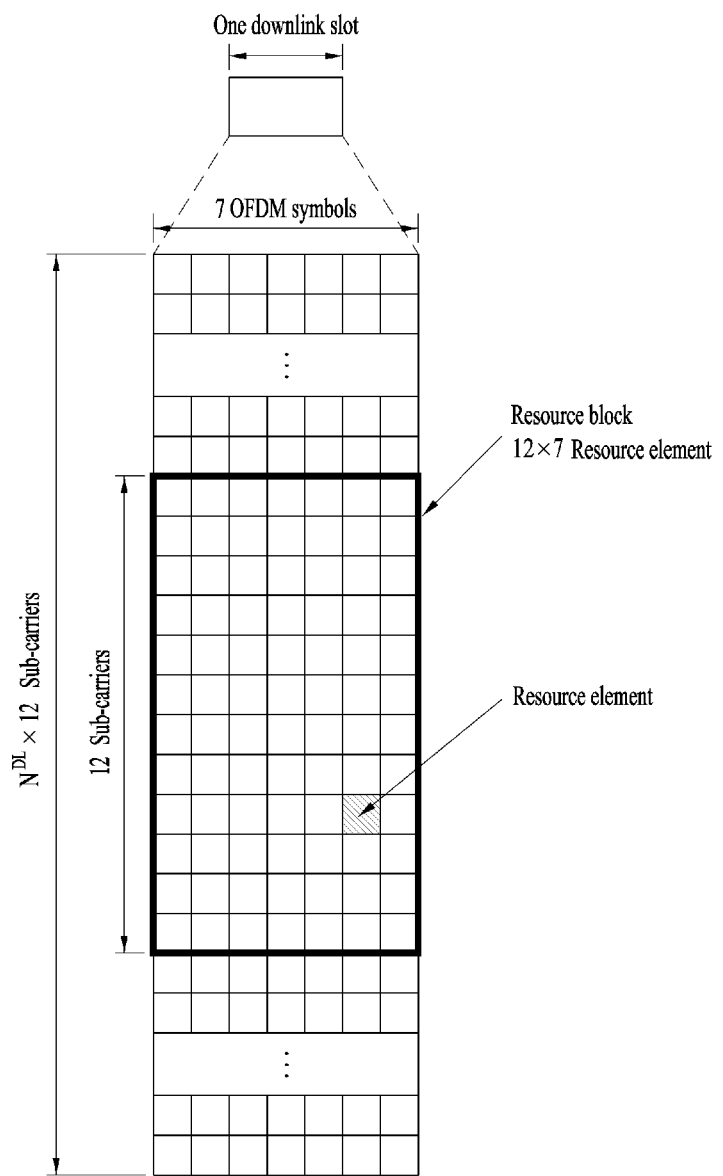
FIG. 5 is a diagram illustrating a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
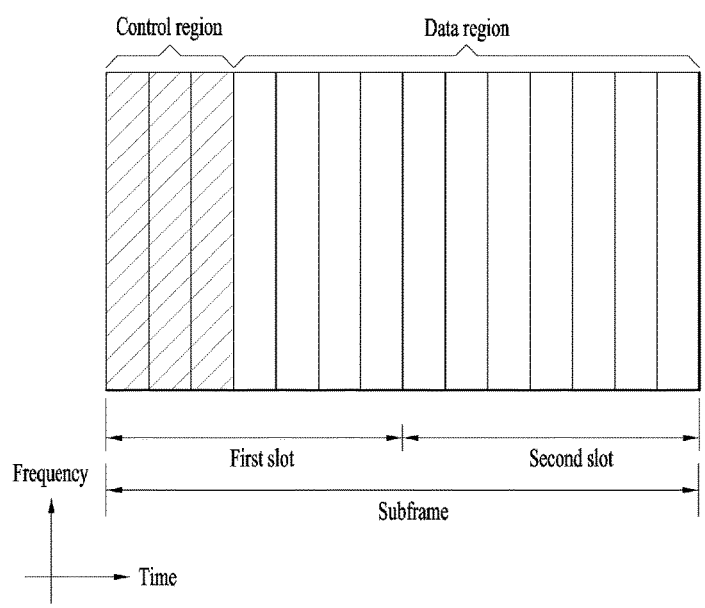
FIG. 6 illustrates the structure of a downlink radio frame used in an LTE system.

FIG. 6 illustrates the structure of a downlink subframe.

TABLE 1

| | Normal cyclic prefix in downlink | | | | | |
|---|---|---|---|---|---|---|
| | | UpPTS | | Extended cyclic prefix in downlink | | |
| | | Normal | Extended | | UpPTS | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_S$ | 2192 · $T_S$ | 2560 · $T_S$ | 7680 · $T_S$ | 2192 · $T_S$ | 2560 · $T_S$ |
| 1 | 19760 · $T_S$ | | | 20480 · $T_S$ | | |
| 2 | 21952 · $T_S$ | | | 23040 · $T_S$ | | |
| 3 | 24144 · $T_S$ | | | 25600 · $T_S$ | | |
| 4 | 26336 · $T_S$ | | | 7680 · $T_S$ | 4384 · $T_S$ | 5120 · $T_S$ |
| 5 | 6592 · $T_S$ | 4384 · $T_S$ | 5120 · $T_S$ | 20480 · $T_S$ | | |
| 6 | 19760 · $T_S$ | | | 23040 · $T_S$ | | |
| 7 | 21952 · $T_S$ | | | 12800 · $T_S$ | | |
| 8 | 24144 · $T_S$ | | | — | — | — |
| 9 | 13168 · $T_S$ | | | — | — | — |

The type-2 radio frame structure, that is, UL/DL configuration in the TDD system is shown in Table 2 below.

Referring to FIG. 6, up to three (four) OFDM symbols at the start of the first slot in a subframe are used for a control

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | region to which control channels are allocated and the other OFDM symbols of the downlink subframe are used for a data region to which a Physical Downlink Shared Channel (PDSCH) is allocated. Downlink control channels used in the 3GPP LTE system include a Physical Control Format Indicator Channel (PCFICH), a Physical Downlink Control Channel (PDCCH), Physical hybrid ARQ indicator Channel (PHICH), and so on. The PCFICH is transmitted in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission.

Control information carried on the PDCCH is called Downlink Control Information (DCI). The DCI includes resource allocation information and other control information for a UE or a UE group. For example, the DCI includes uplink/downlink scheduling information, uplink transmission (Tx) power control command, and so on.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a Random Access Response transmitted on the PDSCH, a set of Tx power control commands for individual UEs of a UE group, a Tx power control command, Voice Over Internet Protocol (VoIP) activation information, etc. A plurality of PDCCHs may be transmitted in the control region. A UE may monitor a plurality of PDCCHs. A PDCCH is transmitted on an aggregation of one or more contiguous Control Channel Elements (CCEs). A CCE is a logical allocation unit used to provide a PDCCH at a coding rate based on the state of a radio channel. A CCE corresponds to a plurality of resource element groups (REGs). The format of a PDCCH and the number of available bits for the PDCCH are determined according to the number of CCEs. An eNB determines the PDCCH format according to DCI transmitted to a UE and adds a Cyclic Redundancy Check (CRC) to control information. The CRC is masked by an Identifier (ID) (e.g., radio network temporary identifier (RNTI)) according to the owner or usage of the PDCCH. For example, if the PDCCH is directed to a specific UE, its CRC may be masked by an ID (e.g., cell-RNTI (C-RNTI)) of a corresponding UE. If the PDCCH is for a paging message, the CRC of the PDCCH may be masked by a paging ID (e.g., paging-RNTI (P-RNTI)). If the PDCCH is directed to system information (in more detail, system Information block (SIC)), its CRC may be masked by system Information RNTI (SI-RNTI). If the PDCCH is directed to random access response, its CRC may be masked by a Random Access-RNTI (RA-RNTI).

FIG. 7 illustrates resource units used to configure a control channel. Specifically, FIG. 7(a) illustrates resource units used to configure a control channel, when the number of Transmission (Tx) antennas in an eNB is 1 or 2 and FIG. 7(b) illustrates resource units used to configure a control channel, when the number of Tx antennas in an eNB is 4. Although a different Reference Signal (RS) pattern is used according to the number of Tx antennas, resources unit related to a control channel are configured in the same manner.

Referring to FIG. 7, a basic resource unit of a control channel is a Resource Element Group (REG). An REG includes 4 contiguous Resource Elements (REs) except for REs used for RSs. A bold square represents an REG in the drawing. A PCFICH and a PHICH include 4 REGs and 3 REGs, respectively. A PDCCH is composed of Control Channel Elements (CCE), each CCE including 9 REGs.

To determine whether a PDCCH having L CCEs is destined for a UE, the UE is configured to monitor $M^{(L)}(\geq L)$ CCRs which are contiguous or arranged in a specific rule. The UE may consider plural L values, for PDCCH reception. CCE sets that the UE should monitor for PDCCH reception are called a search space. For example, search spaces are defined as shown in Table 3 below in the LTE system.

TABLE 3

| | Search space $S_k^{(L)}$ | | Number of PDCCH |
|---|---|---|---|
| Type | Aggregation level L | Size [in CCEs] | candidates $M^{(L)}$ |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

CCE aggregation level, L is the number of CCEs in a PDCCH, $S_k^{(L)}$ represents a search space of CCE aggregation level L, and $M^{(L)}$ is the number of PDCCH candidates to be monitored in a search space with CCE aggregation level L.

Search spaces may be classified into a UE-specific search space accessible only to a specific UE and a common search space accessible to all UEs. A UE monitors common search spaces with CCE aggregation levels 4 and 8 and UE-specific search spaces with CCE aggregation levels 1, 2, 4, and 8. The common search spaces may be overlapped with the UE-specific search spaces.

The position of a first CCE (i.e. a CCE with a lowest index) in a PDCCH search space assigned to a UE, for each CCE aggregation level is changed in every subframe. This is called PDCCH search space hashing.

The CCEs may be distributed in the system band. In more detail, a plurality of logically contiguous CCEs may be input to an interleaver and the interleaver may mix the plurality of CCEs in an REG unit. Accordingly, frequency/time resources included in one CCE are physically dispersed and distributed in the entire frequency/time domain in the control region of the subframe. As a result, although the control channel is configured in a CCE unit, interleaving is performed in an REG unit and, thus, frequency diversity and interference randomization gain may be maximized.

Figure 8:
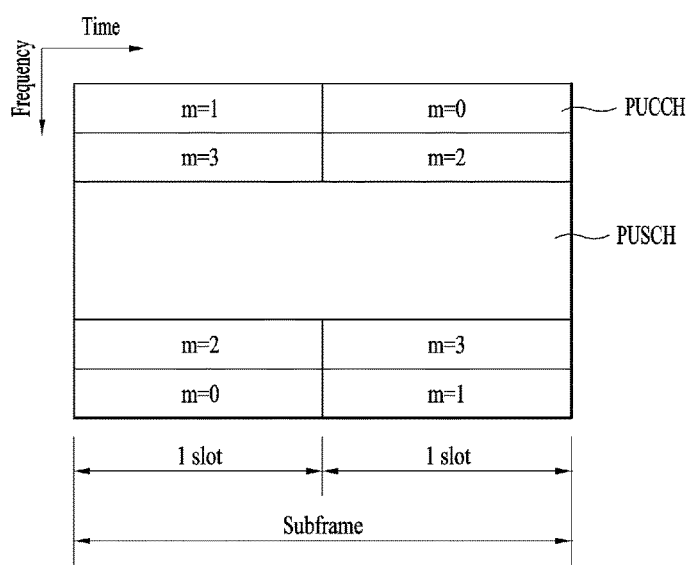
FIG. 8 illustrates a structure of a UL subframe in the LTE.

FIG. 8 illustrates a structure of a UL subframe in the 3GPP LTE system.

Referring to FIG. 8, a UL subframe includes a plurality of (e.g. 2) slots. A slot may include a different number of SC-FDMA symbols according to a CP length. The UL subframe is divided into a control region and a data region in the frequency domain. The data region includes a PUSCH to transmit a data signal such as voice and the control region includes a PUCCH to transmit Uplink Control Information (UCI). The PUCCH occupies a pair of RBs at both ends of the data region on a frequency axis and the RB pair frequency-hops over a slot boundary.

The PUCCH may deliver the following control information.
  Scheduling request (SR): information requesting UL-SCH resources. An SR is transmitted in On-Off Keying (OOK).
  HARQ ACK/NACK: a response signal to a DL data packet received on a PDSCH, indicating whether the DL data packet has been received successfully. A 1-bit ACK/NACK is transmitted as a response to a single DL codeword and a 2-bit ACK/NACK is transmitted as a response to two DL codewords.

Channel State Information (CSI): feedback information regarding a DL channel CSI includes a Channel Quality Indicator (CQI) and Multiple Input Multiple Output (MIMO)-related feedback information includes a Rank Indicator (RI), a Precoding Matrix Indicator (PMI), a Precoding Type Indicator (PTI), etc. The CSI occupies 20 bits per subframe.

The amount of UCI that the UE may transmit in a subframe depends on the number of SC-FDMA symbols available for transmission of control information. The remaining SC-FDMA symbols except SC-FDMA symbols allocated to RSs in a subframe are available for transmission of control information. If the subframe carries a Sound Reference Signal (SRS), the last SC-FDMA symbol of the subframe is also excluded in transmitting the control information. The RSs are used for coherent detection of the PUCCH.

Figure 9:
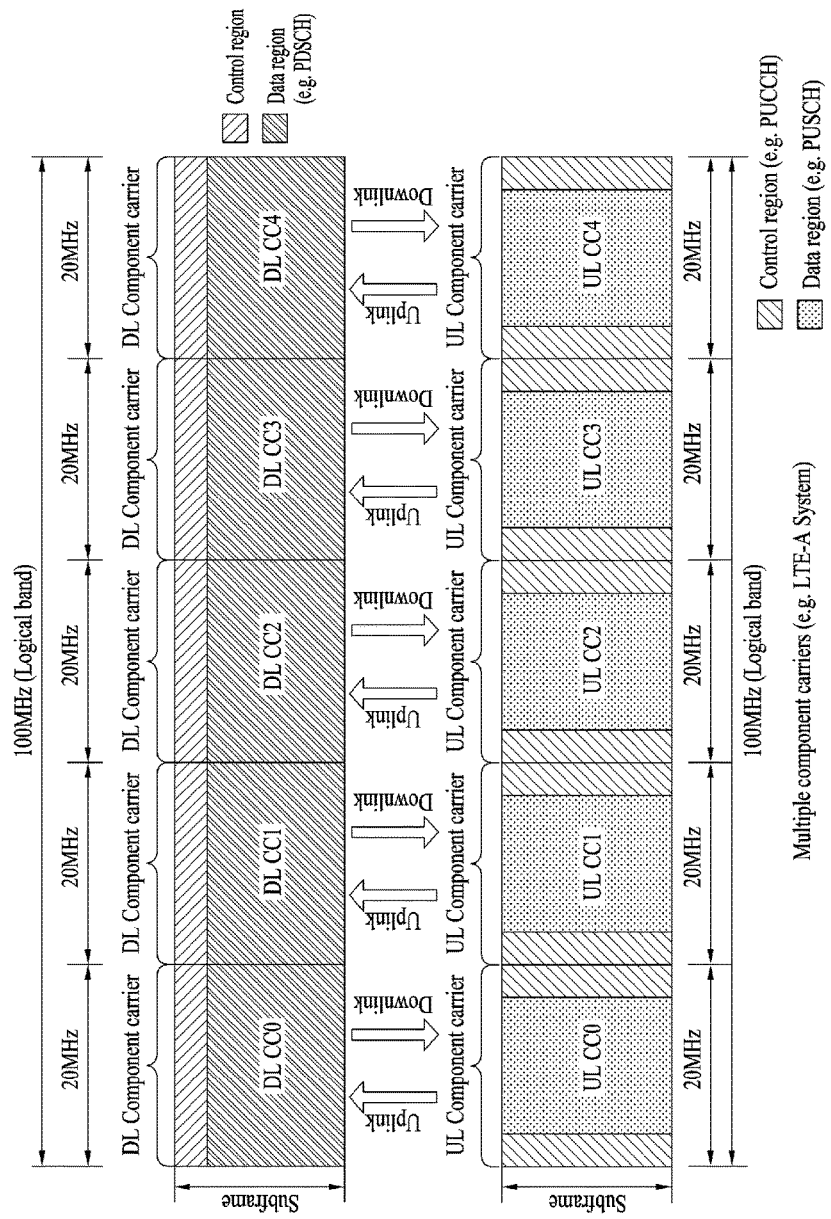
FIG. 9 is a diagram showing a carrier aggregation (CA) communication system.

FIG. 9 is a diagram showing a carrier aggregation (CA) communication system.

Referring to FIG. 9, a plurality of uplink/downlink Component Carriers (CCs) may be aggregated so as to support a wider uplink/downlink bandwidth. The term "CC" may be substituted with other equivalent terms (e.g., carrier, cell, etc.). The CCs may be contiguous or discontiguous in a frequency domain. The bandwidths of the CCs are independently set. Asymmetric CA in which the number of UL CCs and the number of DL CCs are different is also possible. The control information may be set to be transmitted/received only through a specific CC. Such a specific CC may be referred to as a primary CC (or anchor CC) and the remaining CCs may be referred to as secondary CCs.

If cross-carrier scheduling (or cross-CC scheduling) is applied, a PDCCH for downlink allocation may be transmitted through DL CC#0 and a corresponding PDSCH may be transmitted through DL CC#2. For cross-CC scheduling, use of a carrier indicator field (CIF) may be considered. Setting presence/absence of the CIF in the PDCCH may be enabled through higher layer signaling (e.g., RRC signaling) in a semi-static and UE-specific (or UE-group-specific) manner. The base line of PDCCH transmission is summarized as follows:

CIF disabled: A PDCCH on a DL CC is allocated PDSCH resources on the same DL CC and PUSCH resources on a single linked UL CC.
No CIF
The same as LTE PDCCH structure (the same encoding, the same CCE-based resource mapping) and DCI format
   CIF enabled: A PDCCH on a DL CC may be allocated PDSCH or PUSCH resources on specific DL/UL CC of a plurality of merged DL/UL CCs using a CIF
LTE DCI format extended to have CIF
   CIF (if set) is a fixed x-bit field (e.g., x=3)
   The position of the CIF (if set) may be fixed regardless of a DCI format size.
Reuse LTE PDCCH structure (the same encoding, the same CCE-based resource mapping)

If the CIF is present, an eNB may allocate a PDCCH monitoring DL CC set in order to reduce BD complexity of a UE. The PDCCH monitoring DL CC set includes one or more DL CCs as some of all of the merged DL CCs and the UE may detect/decode a PDCCH only in a corresponding DL CC. That is, when the eNB schedules PDSCH/PUSCH to the UE, the PDCCH is transmitted only through the PDCCH monitoring DL CC set. The PDCCH monitoring DL CC set may be set in a UE-specific, UE-group-specific or cell-specific manner. The term "PDCCH monitoring DL CC" may be replaced by an equivalent term such as a monitoring carrier and a monitoring cell. The CC merged for a UE may be replaced by an equivalent term such as a serving CC, a serving carrier, and a serving cell.

Figure 10:
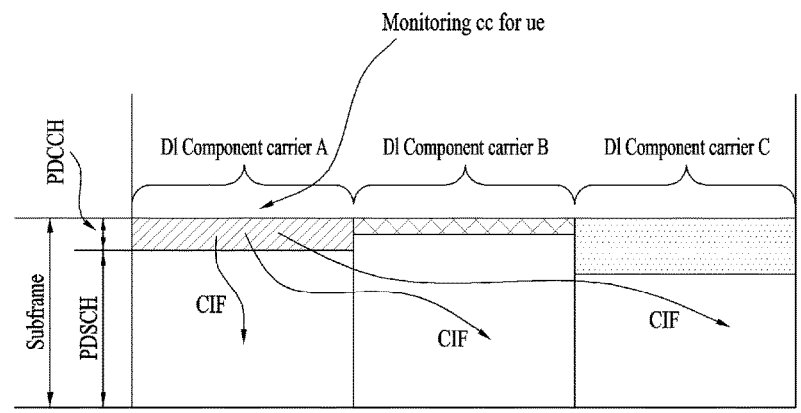
FIG. 10 illustrates scheduling when a plurality of carriers is aggregated.

FIG. 10 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH setting. On the other hand, when the CIF is enabled according to UE-specific (or UE-group-specific or cell-specific) higher layer signaling, the DL CC A (monitoring DL CC) can transmit not only a PDCCH that schedules the PDSCH of other CCs but also PDCCHs that schedule PDSCHs of the DL CC A using the CIF. In this case, PDCCHs are not transmitted in DL CC B/C that is not set to the PDCCH monitoring DL CC. Accordingly, the DL CC A (monitoring DL CC) needs to all of a PDCCH search region related to the DL CC A, a PDCCH search region related to the DL CC B, and a PDCCH search region related to the DL CC C. In this specification, the PDCCH search region is assumed to be defined for each carrier.

As described above, LTE-A considers use of the CIF in the PDCCH for cross-CC scheduling. Whether the CIF is used (that is, support of cross-CC scheduling mode or non-cross-CC scheduling mode) and mode switch may be set semi-static/UE-specifically via RRC signaling and, after the corresponding RRC signaling procedure is performed, the UE may recognize whether the CIF is used in a PDCCH to the scheduled to the UE.

Hereinafter, LTE in unlicensed band (LTE-U) will be described.

As more and more telecommunication devices require greater communication capacity, efficient utilization of limited frequency bands in future wireless communication systems is increasingly becoming an important requirement.

Accordingly, cellular communication systems such as LTE systems are also exploring ways to utilize unlicensed bands (e.g., the 2.4 GHz band and the 5 GHz band), used in legacy Wi-Fi systems, for traffic off-loading.

Basically, since it is assumed that wireless transmission and reception is performed through contention between communication nodes, it is required that each communication node perform channel sensing (CS) before transmitting a signal and confirm that none of the other communication nodes transmit a signal. This operation is referred to as clear channel assessment (CCA), and an eNB or a UE of the LTE system may also need to perform CCA for signal transmission in an unlicensed band (hereinafter, LTE-U band).

In more detail, the licensed band may be a frequency band that exclusively secures a frequency license via a procedure such as auction or purchase by a communication provider. That is, a specific frequency band corresponding to the licensed band may be used only by a specific subject that acquires a license for the licensed band and other users or providers cannot use frequencies of the licensed band.

On the other hand, an unlicensed band may be a band in which a licensed is not exclusively secured. In this case, for example, the unlicensed band may refer to a frequency band in which many communication equipments or systems coexist and is used. In this case, for example, in the unlicensed band, many communication equipments can be unlimitedly used as long as only regulations related to protection of contiguous bands having a specific level or higher and interference in band are obeyed and, thus, it may be difficult to ensure communication quality of a level for providing a communication service through a licensed band in which exclusive license is ensured.

As another example, the unlicensed band may be a region that is set in consideration of temporal and spatial characteristics. In this case, for example, if radio waves of a specific provider that temporally or spatially uses a specific frequency band under a predetermined condition are not affected even when the specific provider uses the specific frequency band, the aforementioned specific frequency band may be an unlicensed band. In this case, a frequency band that is permitted to be used by an unlicensed device under a condition in which TV broadcast, etc., for example, TV white space are not affected may be the aforementioned unlicensed band.

That is, the unlicensed band may refer to a frequency band that is not exclusively occupied differently from the licensed band and may not be limited to the aforementioned embodiments. The unlicensed band may be a band that is used based on other restrictions and conditions such as carrier sensing considering that the band can be used by a plurality of users. Hereinafter, exemplary embodiments of the present invention will be described in consideration of the characteristics of the unlicensed band.

In addition, when an eNB or UE of the LTE system transmits a signal, other communication nodes such as Wi-Fi should also perform CCA in order not to cause interference. For example, in the 801.11ac Wi-Fi standard, the CCA threshold is specified to be −62 dBm for non-Wi-Fi signals and −82 dBm for Wi-Fi signals. Accordingly, the station (STA) or access point (AP) does not perform signal transmission so as not to cause interference when a signal other than Wi-Fi signals are received at a power greater than or equal to −62 dBm. In a Wi-Fi system, the STA or AP may perform CCA and signal transmission if a signal above a CCA threshold is not detected for more than 4 µs.

Hereinafter, the term BS used in the present invention is a used as a generic term that covers a remote radio head (RRH), eNB, a transmission point (TP), a reception point (RP), a relay, and so on.

Hereinafter, for convenience of description, the proposed method will be described based on the 3GPP LTE system. However, the proposed method is also applicable to systems (e.g., UTRA) other than the 3GPP LTE system.

The present invention proposes a method of configuring a resource interval in a cell/carrier in which an available resource interval is secured or configured aperiodically or discontiguously as in the case of an unlicensed band in which exclusive use of a specific system is not guaranteed, and an accompanying UE operation.

Figure 11:
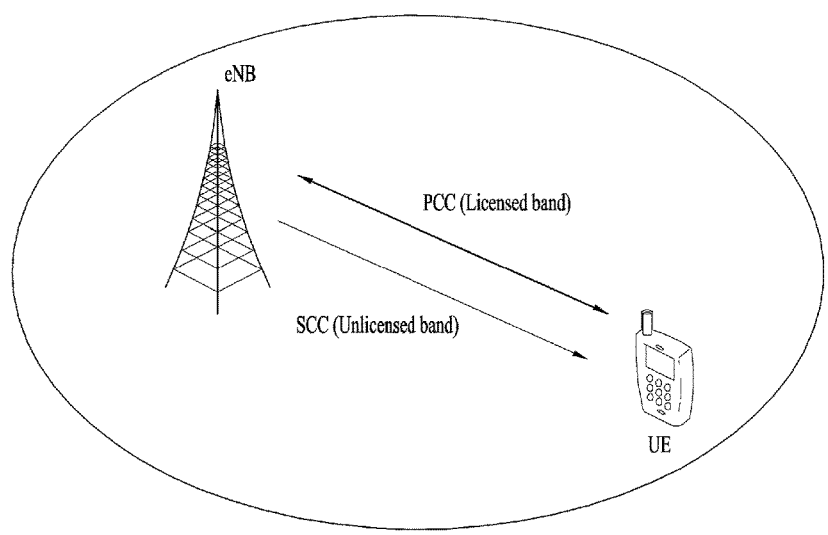
FIG. 11 illustrates the case in which an eNB transmits a signal to a UE or the UE transmits a signal to the eNB in the case of carrier aggregation in licensed band and unlicensed band.

FIG. 11 illustrates the case in which an eNB transmits a signal to a UE or the UE transmits a signal to the eNB in the case of carrier aggregation of LTE-A Band in licensed band and unlicensed band (hereinafter, "LTE-U Band").

In the following description, for convenience of description of the present invention, as illustrated in FIG. 10, it is assumed that the UE is configured to perform radio communication through two component carriers (CCs) in each of the licensed band and the unlicensed band. Here, the carrier in the licensed band can be interpreted as a primary CC (PCC or PCell), and the carrier in the unlicensed band can be interpreted as a secondary CC (SCC or SCell).

However, the proposed schemes of the present invention can be applied even in a situation where a plurality of licensed bands and a plurality of unlicensed bands are used for a carrier aggregation technique, and even a case where signal transmission/reception between an eNB and a UE is performed only in the unlicensed band. In addition, the proposed schemes of the present invention can be applied not only to the 3GPP LTE system but also to systems having other characteristics.

In order to perform communication between an eNB and a UE in an LTE-U band, since the corresponding band is an unlicensed spectrum, the band should be occupied/secured for a specific time period through contention with other communication systems (e.g., WiFi) irrespective of the LTE (hereinafter, the time period occupied/secured for communication in the LTE-U band is referred to as a reserved resource period (RRP)). There are various methods for securing the reserved resource period (RRP).

Typically, a specific reservation signal may be transmitted such that other communication system devices such as WiFi can recognize that the corresponding wireless channel is busy, or the RS and the data signal may be continuously transmitted such that a signal having a specific power level or higher is continuously transmitted during the RRP interval.

If the eNB has predetermined the RRP time interval to occupy the LTE-U band, the eNB can inform the UE of the RRP time interval so that the UE can maintain the communication transmission/reception link during the indicated reserved resource period.

As a method of transmitting corresponding reserved resource period (RRP) information to a UE, the reserved resource period (RRP) information may be transmitted to the UE through another CC (e.g., LTE-A band) connected in the form of carrier aggregation.

As another example of the unlicensed band operation performed in the contention-based random access scheme, the eNB may perform carrier sensing (CS) before data transmission/reception. If it is determined that the channel of the SCell is currently busy or idle when the channel status is checked, the eNB may transmit control information (e.g., scheduling grant) over the (E)PDCCH of the PCell (i.e., cross carrier scheduling (CCS)) or the SCell PDCCH In this case, an RRP interval consisting of M contiguous subframes (SF) may be configured (Here, M is a natural number). Here, the eNB may pre-inform the UE through higher layer signaling (using PCell) or a physical control/data channel of the value of M and the usage of the M SFs. The start time of the RRP interval may be set periodically (or semi-statically) by higher layer signaling. Alternatively, the start time of the RRP interval may be specified through physical layer signaling in SF #n or SF # (n-k) when the start time of the RRP interval needs to be set to SF #n.

FIG. 12 illustrates a reserved resource period (RRP) according to the present invention. Referring to FIG. 12, in the case of a subframe including the reserved resource period (RRP), as illustrated in FIG. 12(a), a subframe boundary or a subframe number/index may be configured to be aligned with the Pcell. For convenience of description, the case shown in FIG. 12(a) is referred to as "aligned-RRP".

In addition, as shown in FIG. 12(b), a subframe boundary or a subframe number/index may be configured to support a format in which the subframe boundary or the subframe number/index is not aligned with the Pcell. For convenience of description, the case shown in FIG. 12(b) is referred to as "floating-RRP".

In the present invention, the subframe boundaries aligned between cells may mean that the interval between subframe boundaries of two different cells is shorter than or equal to a specific time (for example, CP length or X us, where X≥0). In addition, in the present invention, a Pcell may refer to a specific cell that is referred to in order to determine a subframe (and/or symbol) boundary of an Scell (hereinafter, Ucell) based on LTE-U in terms of time (and/or frequency) synchronization.

As described above, the present invention proposes a method of effectively configuring/managing and monitoring (or blind-decoding a (control channel) search space (i.e., SS) for a situation of carrier aggregation (CA) including a cell (or carrier) in which available resource periods are aperiodically or discontiguously ensured or configured like in an LTE-U system that randomly operated based on a carrier sensing (CS) operation in the aforementioned unlicensed band with regard to the present invention.

In the present invention, a situation of carrier aggregation (CA) between a PCell operating in an existing licensed band and an SCell operating using the LTE-U method is considered and, for convenience of description, as described above, the LTE-U-based SCell is referred to as "UCell" and a resource period that is aperiodically ensured/configured in the corresponding UCell is referred to as "reserved resource period (RRP)".

A PDSCH related control information channel transmitted on a downlink subframe (DL SF) (or subframe determined for downlink) of a reserved resource period (RRP) or a PUSCH related control information channel transmitted on an uplink subframe (UL SF) (or subframe for uplink) of a reserved resource period (RRP) may be configured to be transmitted (i.e., cross-carrier scheduled (CCS)) from the PCell or configured to be transmitted (i.e., self-scheduled (SFS)) from the same UCell.

The PDSCH reception related downlink control information channel in the reserved resource period (RRP) may be embodied in the form of i) scheduling one PDSCH in which one downlink control information channel is received at the same time point (i.e., "single subframe scheduling (SSFS)" or ii) scheduling a predefined or signaled number of PDSCHs that are received at different time points (i.e., "multi subframe scheduling (MSFS)") as well as one PDSCH in which one downlink control information channel is received at the same time point.

For example, in consideration of a resource in which a reserved resource period (RRP) on an UCell is aperiodically or discontiguously configured dependent upon a result of carrier sensing (CS), the corresponding reserved resource period (RRP) may be (re)defined or (re)interpreted in terms of operations and assumption of a UE. For example, the reserved resource period (RRP) on the UCell may be (re)defined/(re)interpreted as at least one of i) a period in which it is assumed that a UE performs a time/frequency synchronization operation on the UCell or a synchronization signal (e.g., PSS and SSS) for the operation is transmitted (from an eNB), ii) a period in which the UE performs a CSI measurement operation on the UCell or a reference signal (e.g., CRS and CSI-RS) for the operation is transmitted (from an eNB), iii) a period in which the UE performs a data transmission (/reception) related DCI detection operation in the UCell, or iv) the UE performs a (temporal or arbitrary) buffering operation on a signal received in the UCell.

Hereinafter, for convenience of description, a proposed method based on a 3GPP LTE system will be described. However, a range of the system to which the proposed method is applied may be extended to other systems other than the 3GPP LTE system.

Based on the aforementioned conditions, the method of effectively configuring/managing and monitoring a (control channel) search space (SS) for an operation of CA including an RRP-based UCell may include first to third methods below. Here, for example, in the first to third methods, a situation in which a UCell is used as a CCS scheme (from a PCell) is considered.

For example, the UCell RRP may be configured in such a way that i) an entire portion is configured as DL SFs or ii) a partial portion is configured as DL SFs and the remaining portion is configured as UL SFs (through a predefined signal or rule).

For example, the following first to third methods may be configured to be restrictedly applied only to the case in which an UCell is used as an SSFS scheme and/or an UCell is used as a MSFS scheme. For example, hereinafter, the following first to third methods may also be extensively applied to the case in which the UCell is used as an SFS scheme.

Hereinafter, for convenience of description, a CCS operation related scheduling cell (SCHEDULING CELL) and scheduled cell (SCHEDULED CELL) are referred to as "SCG_Cell", and "SCD_Cell", respectively. Hereinafter, for convenience of description, for example, a PCell is assumed to be an SCG_Cell of a UCell but the proposed methods according to the present invention may be extensively applied to the case in which another (licensed and/or unlicensed band-based) SCells instead of a PCell is a SCG_Cell of the UCell.

Hereinafter, for convenience of description, a UE-specific search space (UE-SPECIFIC SS) and a common search space (COMMON SS) are referred to as "USS", and "CSS", respectively.

For example, the first to third methods may be configured to be restrictedly applied only to the UCell USS and/or the UCell CSS.

First Method

According to the present invention, when a UCell is used as a CCS scheme (from a PCell (i.e., CCS related SCG_Cell of UCell)), a UE may be configured not to perform a blind-decoding operation on a UCell SS in a non-reserved resource period (hereinafter, UCell NON-RRP) on the UCell. Here, the UCell SS may be configured on the PCell for CCS of a corresponding UCell. For example, the UE may detect data related scheduling information to be transmitted/received on the corresponding UCell through a blind decoding operation with respect to the UCell SS.

The UCell NON-RRP period refers to the remaining period except for the UCell RRP period and it may be assumed that a data transmission/reception operation on the UCell is not performed in the corresponding UCell NON-RRP period. Application of this method may be interpreted as if the UCell SS is configured in the PCell and the UE does not perform only a blind-decoding operation on the corresponding UCell SS in the UCell NON-RRP period.

Second Method

According to the present invention, when the UCell is used as a CCS scheme (from PCell (i.e., CCS related SCG_Cell of UCell)), a UCell SS may be configured not to be configured on the PCell in a UCell NON-RRP period.

According to the present invention, since the UCell SS is not configured on the PCell, a UE may not perform a blind-decoding operation on the corresponding UCell SS in the UCell NON-RRP period.

According to the present invention, the UCell (or SCell) may be determined to be temporally deactivated or only the PCell may be determined to be configured in the UCell NON-RRP period. Accordingly, in the UCell NON-RRP period, the PCell SS may be configured with the same size/structure as in the case in which only the PCell is configured (i.e., in the case of a single cell).

Third Method

According to the present invention, when at least some of the aforementioned first and second methods are applied in the UCell NON-RRP period, a blind decoding number of times of the UCell SS that is not used/performed in the corresponding UCell NON-RRP may be configured to be reallocated (or reused) for a blind-decoding operation with respect to the PCell SS.

Here, an operation of reallocating the blind decoding number of times may be configured to be performed in the same aggregation level (AL) or configured to be performed between different ALs according to a predefined rule.

As an example of reallocation between different ALs, an operation of reallocating a blind-decoding number of times may be performed by predefining the number of times in ascending order (or descending order) of an AL value or (sequentially) filling a maximum signaled blind-decoding number of times. Here, maximum blind-decoding number of times for each AL related to an operation of reallocating the blind-decoding number of times may be differently (or independently) configured.

As another example, when the aforementioned first or second method is applied in the UCell NON-RRP period, i) a blind-decoding number of times with respect to the UCell USS (and/or UCell CSS) that is not used/performed in the corresponding UCell NON-RRP period may be configured to be reallocated (or reused) for a blind-decoding operation with respect to the PCell CSS or ii) a blind-decoding number of times with respect to the UCell USS (and/or UCell CSS) that is not used/performed in the corresponding UCell NON-RRP period may be configured to be reallocated (or reused) for a blind-decoding operation with respect to the PCell USS.

Here, the UCell USS (and/or UCell CSS) blind decoding number of times reallocated for the PCell CSS blind decoding operation may be configured to be used only to detect a predefined signal. For example, the corresponding signal may be determined as a newly defined (or introduced) DCI in order to signal RRP related information (e.g., RRP start point/end point/use information).

Furthermore, the aforementioned embodiments/configurations/rules according to the present invention may correspond to each independent method for an embodiment and may be embodied by combining/merging at least some of the aforementioned embodiments of the present invention.

FIG. 13 illustrates a base station (BS) and a UE according to an exemplary embodiment of the present invention.

When a wireless communication system includes a relay, communication in a backhaul link is performed between the BS and the relay and communication in an access link may be performed between the relay and the UE. Accordingly, the BS or the UE illustrated in the drawing may be replaced by a relay depending on the situations.

Referring to FIG. 13, the wireless communication system includes a BS 110 and a UE 120. The BS 110 may include a processor 112, a memory 114, and a radio frequency (RF) unit 116. The processor 112 may be configured to embody the procedures and/or methods proposed according to the present invention. The memory 114 may be connected to the processor 112 and may store various information items related to an operation of the processor 112. The RF unit 116 may be connected to the processor 112 and may transmit and/or receive a radio signal. The UE 120 may include a processor 122, a memory 124, and an RF unit 126. The processor 122 may be configured to embody the procedures and/or methods proposed according to the present invention. The memory 124 may be connected to the processor 122 and may store various information items related to an operation of the processor 122. The RF unit 126 may be connected to the processor 122 and may transmit and/or receive a radio signal. The BS 110 and/or the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying the aforementioned method and apparatus for monitoring a user equipment (UE)

in a wireless communication system that supports carrier aggregation to a 3$^{rd}$ generation partnership project (3GPP) long term evolution (LTE) system has been described, the present invention is applicable to various wireless communication systems in addition to the 3GPP LTE system.

The invention claimed is:

1. A monitoring method of a user equipment (UE) in a wireless communication system for supporting carrier aggregation, the method comprising:
receiving information on a first resource period that is cross-carrier scheduled by a first cell, wherein the first cell comprises contiguous radio resource;
blind-decoding on a first search space, in the first resource period, related to first control information on a physical downlink shared channel (PDSCH) of the second cell,
wherein the blind-decoding on the first search space in a second resource period is skipped,
wherein the first resource period comprises discontiguous radio resources of the second cell configured to be occupied by the UE, and
wherein the second resource period comprises radio resources except for the first resource period; and
blind-decoding on a second search space, in the second resource period, related to second control information on a PDSCH of the first cell,
wherein an unused number of the blind-decoding, in the second resource period, on the first search space related to the first control information is configured to be used to detect information on the first resource period.

2. The method according to claim 1, wherein the UE is configured not to perform blind-decoding on the second search space related to the first control information in the second resource period.

3. The method according to claim 1, wherein only the second search space related to the second control information on the PDSCH of the first cell is set in the second resource period.

4. The method according to claim 1, wherein:
the first cell is a licensed band; and
the second cell is an unlicensed band.

5. The method according to claim 1, wherein radio resources of the second cell are occupied only by the UE.

6. A user equipment (UE) for performing monitoring in a wireless communication system for supporting carrier aggregation, the UE comprising:
a transceiver; and
a processor,
wherein the processor is configured to:
receive information on a first resource period that is cross-carrier scheduled by a first cell, wherein the first cell comprises contiguous radio resources,
blind-decode on a first search space, in a first resource period, related to first control information on a physical downlink shared channel (PDSCH) of the second cell,
wherein the first resource period comprises discontiguous radio resources of the second cell configured to be occupied by the UE, and
wherein the second resource period comprises radio resources except for the first resource period, and
blind-decode on a second search space, in the second resource period, related to second control information on a PDSCH of the first cell,
wherein an unused number of the blind-decoding, in the second resource period, on the first search space related to the first control information is configured to be used to detect information on the first resource period.

* * * * *